US012712981B2

(12) United States Patent
Ihara

(10) Patent No.: US 12,712,981 B2
(45) Date of Patent: Aug. 18, 2026

(54) IMAGE PICKUP APPARATUS THAT REDUCES LOSS OF OPPORTUNITIES FOR PHOTOGRAPHING, CONTROL METHOD FOR IMAGE PICKUP APPARATUS, AND STORAGE MEDIUM

(71) Applicant: CANON KABUSHIKI KAISHA, Tokyo (JP)

(72) Inventor: Kenta Ihara, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 170 days.

(21) Appl. No.: 18/652,279

(22) Filed: May 1, 2024

(65) Prior Publication Data

US 2024/0397017 A1 Nov. 28, 2024

(30) Foreign Application Priority Data

May 26, 2023 (JP) ................................ 2023-086868

(51) Int. Cl.
*H04N 5/77* (2006.01)
*H04N 23/667* (2023.01)

(52) U.S. Cl.
CPC .......... *H04N 5/772* (2013.01); *H04N 23/667* (2023.01)

(58) Field of Classification Search
CPC ............................ H04N 5/772; H04N 23/667
USPC .................................................... 348/231.99
See application file for complete search history.

(56) References Cited

FOREIGN PATENT DOCUMENTS

| | | | |
|---|---|---|---|
| JP | 2002252804 | * | 9/2002 |
| JP | 2002252804 | A | 9/2002 |
| JP | 2014115318 | * | 6/2014 |

* cited by examiner

*Primary Examiner* — Joel W Fosselman
(74) *Attorney, Agent, or Firm* — Cowan, Liebowitz & Latman, P.C.

(57) ABSTRACT

An image pickup apparatus reducing a loss of opportunities for photographing is provided. The image pickup apparatus, which starts photographing preparation based on a first photographing instruction and performs actual photographing based on a second photographing instruction, includes an image pickup device to generate a photographed image, a temporary recording memory to temporarily record the photographed image, a precapture photographing control unit to, when a precapture function is turned on, control precapture photographing to record the photographed image in the temporary recording memory based on the first photographing instruction, an accepting unit to accept an instruction to switch turning-on/turning-off of the precapture function, and an obtaining unit to obtain a photographing failure probability evaluation value. The precapture photographing control unit turns on the precapture function when the photographing failure probability evaluation value exceeds a predetermined threshold value, and executes the precapture photographing when the first photographing instruction has been issued.

5 Claims, 7 Drawing Sheets

Figure 2:
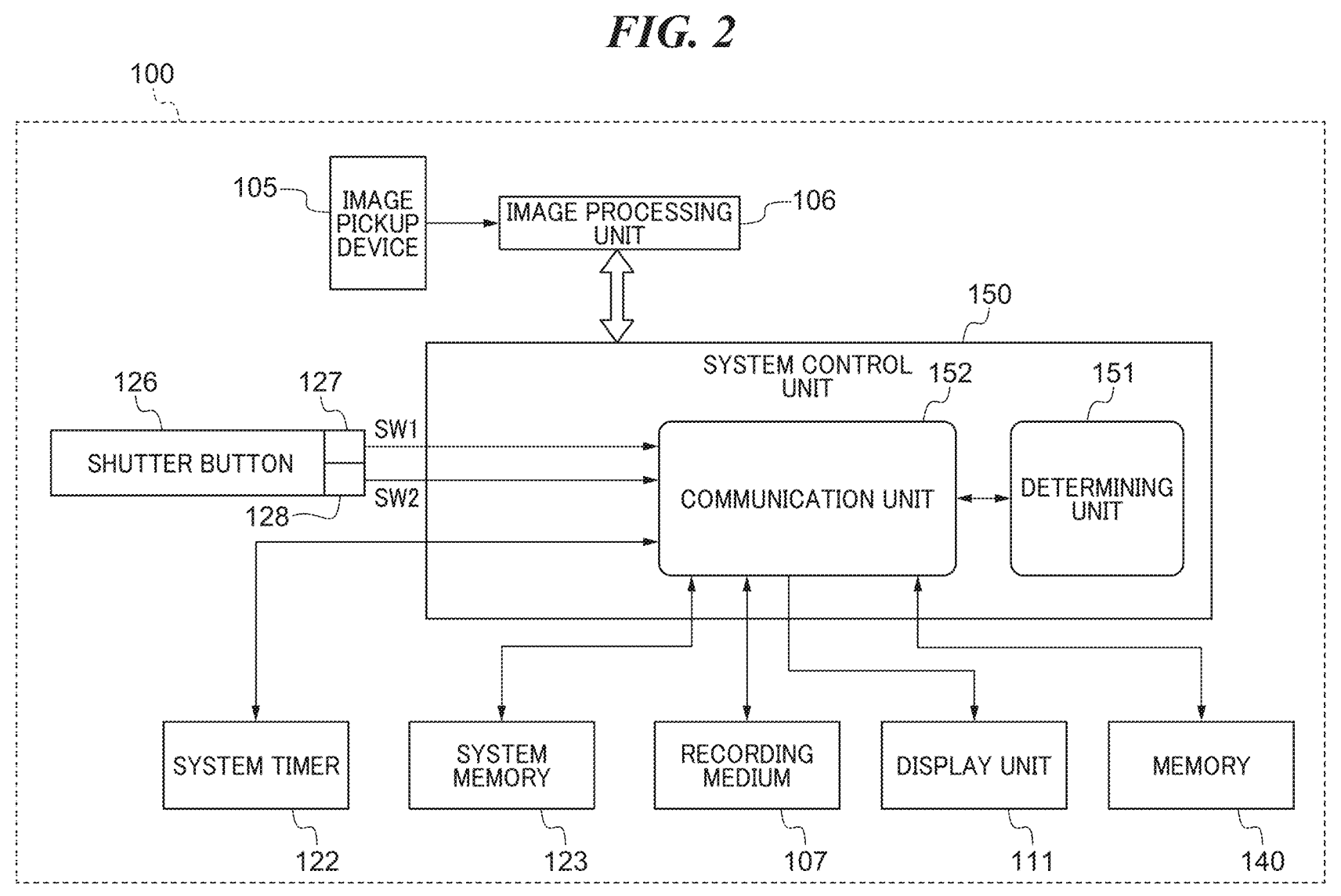

IMAGE PICKUP DEVICE
105

IMAGE PROCESSING UNIT
106

SYSTEM CONTROL UNIT
150

COMMUNICATION UNIT
152

DETERMINING UNIT
151

SHUTTER BUTTON
126
127
128
SW1
SW2

MEMORY
140

DISPLAY UNIT
111

RECORDING MEDIUM
107

SYSTEM MEMORY
123

SYSTEM TIMER
122

START
OBTAIN LENS APERTURE VALUE
S200
OBTAIN LENS FOCAL LENGTH
S201
LENS APERTURE VALUE IS OPENED TO PREDETERMINED APERTURE VALUE OR MORE? OR LENS FOCAL LENGTH IS EQUAL TO OR LONGER THAN PREDETERMINED DISTANCE?
S202
NO
YES
SUBJECT HAS BEEN DETECTED?
S203
NO
YES
HAVE OBTAINED FIRST PHOTOGRAPHING INSTRUCTION?
S204
NO
YES
PERFORM PRECAPTURE PHOTOGRAPHING
S205
END

IMAGE PICKUP APPARATUS THAT REDUCES LOSS OF OPPORTUNITIES FOR PHOTOGRAPHING, CONTROL METHOD FOR IMAGE PICKUP APPARATUS, AND STORAGE MEDIUM

BACKGROUND OF THE INVENTION

Field of the Invention

The present invention relates to an image pickup apparatus, a control method for the image pickup apparatus, and a storage medium, and more particularly relates to an image pickup apparatus that is equipped with a precapture function, a control method for the image pickup apparatus, and a storage medium.

Description of the Related Art

Conventionally, in an image pickup apparatus such as a digital camera, there is an issue in that it is difficult to photograph an image desired by a photographer due to a time lag between when the photographer presses down a release button of the camera to issue a photographing instruction and when recording of photographing actually starts.

In order to deal with the above issue, for example, Japanese Laid-Open Patent Publication (kokai) No. 2002-252804 has proposed a camera that is equipped with a precapture function. This repeatedly executes photographing while the first stage of a release button is being pressed down so that a predetermined number of images are stored in a buffer memory. The images stored in the buffer memory at a point of time when the second stage of the release button has been pressed and an image photographed at a point of time when the second stage of the release button has been pressed down are stored in a recording medium.

By using such a precapture function, it is possible to perform recording of photographing retroactively from the moment the photographer issues a photographing instruction.

However, the conventional technique disclosed in Japanese Laid-Open Patent Publication (kokai) No. 2002-252804 is a technique that performs precapture photographing at a constant cycle while the first stage of the release button is being pressed down when a setting to use the precapture function has been performed. Therefore, in the case that the photographer has intended to perform the precapture photographing, but has forgot to perform the setting to use the precapture function, even if the photographer has pressed down the first stage of the release button, the precapture photographing will not be performed, resulting in a loss of opportunities for photographing.

SUMMARY OF THE INVENTION

The present invention provides an image pickup apparatus that reduces a loss of opportunities for photographing, a control method for the image pickup apparatus, and a storage medium.

Accordingly, the present invention provides an image pickup apparatus that starts photographing preparation based on a first photographing instruction and performs actual photographing based on a second photographing instruction, the image pickup apparatus comprising an image pickup device configured to generate a photographed image from an optical image guided via a lens unit, a temporary recording memory configured to temporarily record the photographed image, a precapture photographing control unit configured to, in a case that a precapture function is turned on, control precapture photographing to record the photographed image in the temporary recording memory based on the first photographing instruction, an accepting unit configured to accept an instruction to switch turning-on/turning-off of the precapture function from a user, and an obtaining unit configured to obtain a photographing failure probability evaluation value. The precapture photographing control unit turns on the precapture function in a case that the photographing failure probability evaluation value exceeds a predetermined threshold value, and executes the precapture photographing when the first photographing instruction has been issued.

Accordingly, the present invention provides an image pickup apparatus that starts photographing preparation based on a first photographing instruction and performs actual photographing based on a second photographing instruction, the image pickup apparatus comprising an image pickup device configured to generate a photographed image from an optical image guided via a lens unit, a temporary recording memory configured to temporarily record the photographed image, an obtaining unit configured to obtain a lens aperture value of the lens unit, a precapture photographing control unit configured to, in a case that a precapture function is turned on, control precapture photographing to record the photographed image in the temporary recording memory based on the first photographing instruction, and an accepting unit configured to accept an instruction to switch turning-on/turning-off of the precapture function from a user. The precapture photographing control unit turns on the precapture function in a case that the lens aperture value is opened to a predetermined aperture value or more, and executes the precapture photographing when the first photographing instruction has been issued.

Accordingly, the present invention provides an image pickup apparatus that starts photographing preparation based on a first photographing instruction and performs actual photographing based on a second photographing instruction, the image pickup apparatus comprising an image pickup device configured to generate a photographed image from an optical image guided via a lens unit, a temporary recording memory configured to temporarily record the photographed image, an obtaining unit configured to obtain a lens focal length of the lens unit, a precapture photographing control unit configured to, in a case that a precapture function is turned on, control precapture photographing to record the photographed image in the temporary recording memory based on the first photographing instruction, and an accepting unit configured to accept an instruction to switch turning-on/turning-off of the precapture function from a user. The precapture photographing control unit turns on the precapture function in a case that the lens focal length is equal to or longer than a predetermined distance, and executes the precapture photographing when the first photographing instruction has been issued.

According to the present invention, it is possible to provide the image pickup apparatus that reduces the loss of the opportunities for photographing, the control method for the image pickup apparatus, and the storage medium.

Further features of the present invention will become apparent from the following description of exemplary embodiments with reference to the attached drawings.

BRIEF DESCRIPTION OF THE DRAWINGS

FIG. 2 is a block diagram for explaining the operation of precapture photographing of the present invention executed by the camera main body.

DESCRIPTION OF THE EMBODIMENTS

The present invention will now be described in detail below with reference to the accompanying drawings showing embodiments thereof.

Hereinafter, preferred embodiments of the present invention will be described in detail based on the accompanying drawings.

Figure 1:
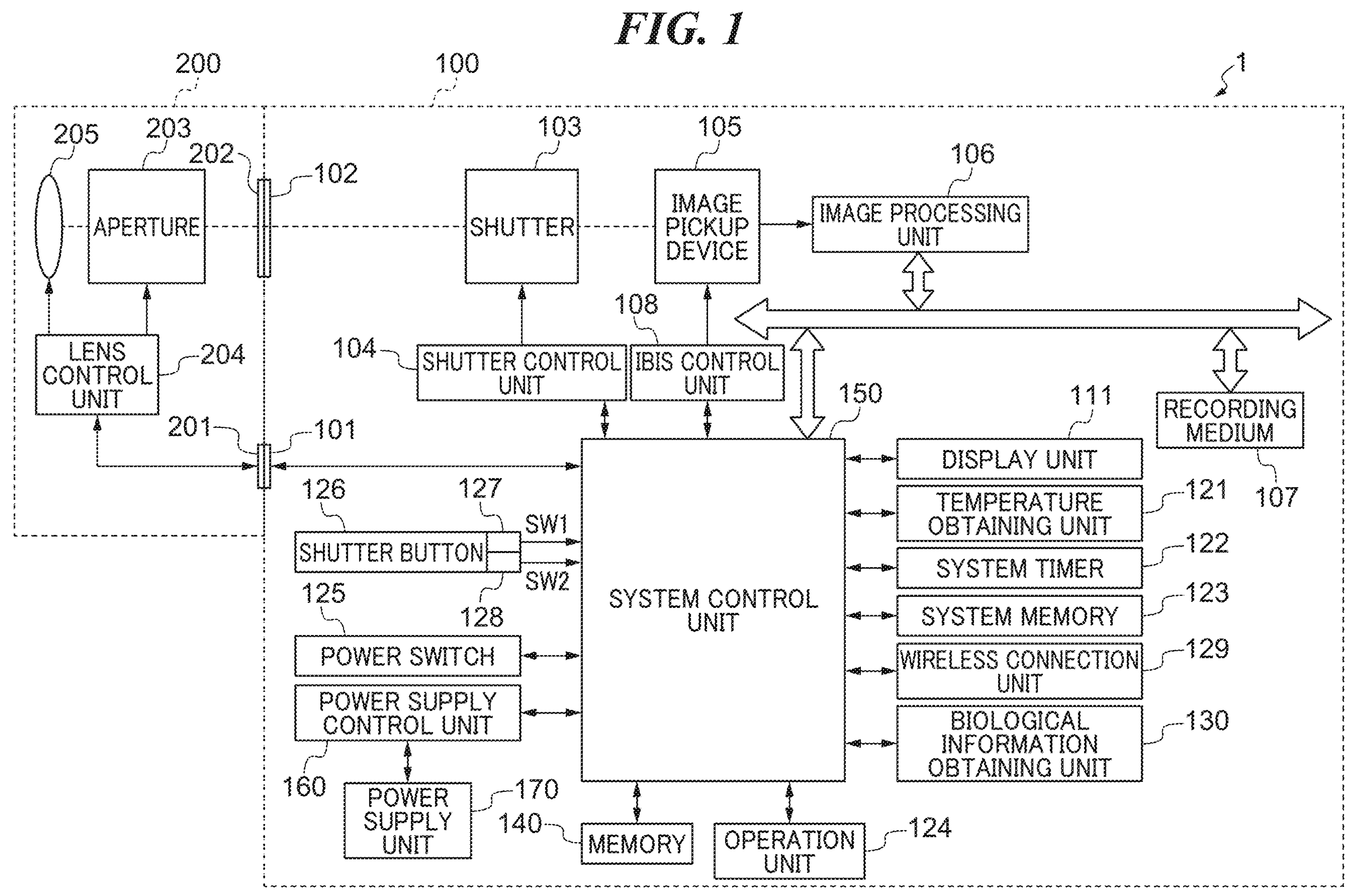
FIG. 1 is a block diagram that shows a hardware configuration of a lens unit interchangeable camera including a camera main body as an image pickup apparatus according to an embodiment of the present invention.

FIG. 1 is a block diagram that shows a hardware configuration of a lens unit interchangeable camera including a camera main body 100 as an image pickup apparatus according to an embodiment of the present invention.

As shown in FIG. 1, a lens unit interchangeable camera 1 is a lens unit interchangeable camera that includes the camera main body 100 and a lens unit 200, which guides incident light to an image pickup device 105 within the camera main body 100.

The camera main body 100 includes a connector 101, a lens mount 102, a shutter 103, a shutter control unit 104, the image pickup device 105, an image processing unit 106, a recording medium 107, an IBIS control unit 108, a display unit 111, and a temperature obtaining unit 121. In addition, the camera main body 100 includes a system timer 122, a system memory 123, an operation unit 124, a power switch 125, a shutter button 126, a wireless connection unit 129, a biological information obtaining unit 130, a memory 140, a system control unit 150, a power supply control unit 160, and a power supply unit 170.

Furthermore, as shown in FIG. 1, the lens unit 200 includes a connector 201, a lens mount 202, an aperture 203, a lens control unit 204, and a lens 205.

First, the configuration of the camera main body 100 will be described.

The shutter control unit 104 controls the shutter 103 based on exposure information from the image processing unit 106 in cooperation with the lens control unit 204 that controls the aperture 203.

In the image pickup device 105, an optical image of a subject (not shown) is formed via the lens 205, the aperture 203, the lens mount 202, the lens mount 102, and the shutter 103, and then the image pickup device 105 converts the optical image into electrical signals and generates a photographed image.

The image processing unit 106 performs a predetermined calculation processing with respect to the photographed image inputted from the image pickup device 105, and then performs image processing such as a pixel interpolation processing, a color conversion processing, and a white balance processing with respect to the photographed image based on the calculation result of the predetermined calculation processing, and outputs the photographed image that has been image-processed to the display unit 111. In addition, the image processing unit 106 includes an image compression function such as JPEG, and a subject detection function that detects a subject to be photographed (a subject that is a photographing target) from a live view image.

The recording medium 107 is an attachable/detachable recording medium such as a semiconductor memory for recording or reading out data such as photographed images, etc.

The IBIS control unit 108 is an in-camera image stabilization mechanism that performs in-body image stabilizer control (IBIS control), and is able to perform control to correct shaking or the like of the camera main body 100 by moving the image pickup device 105.

The temperature obtaining unit 121 is disposed at each location of the camera main body 100, and is able to obtain a temperature at the portion where the temperature obtaining unit 121 is disposed.

The operation unit 124 is operation means for inputting various kinds of predetermined operation instructions into the system control unit 150. These operation means are configured by any one of switches, dials, a touch panel, a pointing device based on line-of-sight detection, a voice recognition device, etc., or a combination thereof. A user is also able to use the operation unit 124 (an accepting unit) to issue an instruction to switch turning-on/turning-off of a precapture function, which will be described below.

The system timer 122 measures a time used in various kinds of controls and a time of a built-in clock.

A random access memory (a RAM) is used as the system memory 123. Constants and variables that are necessary for the operations of the system control unit 150, programs read out from the memory 140, and the like are loaded into the system memory 123.

The power switch 125 can switch and set a power-on mode and a power-off mode of the camera main body 100.

The shutter button 126 is an operation unit for issuing a photographing instruction. The shutter button 126 is provided with a touch sensor (not shown) (a third detecting unit) that detects whether or not a finger has been placed on a top surface of the shutter button 126, and the detection result is transmitted to the system control unit 150.

A first shutter switch 127 is turned on in the middle of an operation of the shutter button 126 provided on the camera main body 100, that is, by a so-called half-pressing of the shutter button 126, and generates a first shutter switch signal SW1 (a first photographing instruction). The system control unit 150 receives the first shutter switch signal SW1 from the shutter button 126, and starts photographing preparation operations such as an autofocus processing, an auto exposure processing, an auto white balance processing, a preliminary light emission before flash processing, precapture photographing, etc. The first shutter switch signal SW1 is turned off upon the completion of the half-pressing operation of the shutter button 126.

A second shutter switch 128 is turned on when the operation of the shutter button 126 is completed, that is, by a so-called full-pressing of the shutter button 126, and generates a second shutter switch signal SW2 (a second photographing instruction). The system control unit 150 receives the second shutter switch signal SW2 from the shutter button 126, and performs actual photographing (main photographing). It should be noted that, in the case that the precapture function is turned on, when the second photographing instruction is issued following the first photographing instruction, operations of a series of photographing processing from reading out signals from the image pickup device 105 to writing image data into the recording medium 107 are performed. In other words, the precapture photographing is performed by the half-pressing operation of the shutter button 126, then the actual photographing is performed by the full-pressing operation of the shutter button 126, and a precapture-photographed image group obtained by the precapture photographing and an actual-photographed image obtained by the actual photographing are stored in the recording medium 107.

The wireless connection unit 129 is able to switch between a mode in which the camera main body 100 is connected to a wireless local area network (a wireless LAN) and a mode in which the camera main body 100 is not connected to the wireless LAN. In addition, a wireless connection delay time at the time of wireless connection is stored in the memory 140.

The biological information obtaining unit 130 obtains biological information such as a blood pressure, a brain wave, and/or a line of sight, which is biological information of a photographer. In addition, the biological information obtaining unit 130 obtains eye contact detection information indicating whether or not an eye of the photographer is in contact with an electronic view finder (an EVF) (not shown), which is from an eye contact detection sensor (a first detecting unit) in the EVF, and line-of-sight detection information indicating a line-of-sight detection result of the photographer, which is from a line-of-sight detection sensor (a second detecting unit) in the EVF.

The memory 140 also includes a nonvolatile memory that can be electrically erased and stored, and a read only memory (a ROM) is used as the memory 140. The constants, the programs, etc., which are necessary for the operations of the system control unit 150, are stored in the memory 140. The programs referred to here mean programs for executing various kinds of flowcharts, which will be described below in the present embodiment.

The system control unit 150 is a control unit including at least one processor, and controls the operation of the entire camera main body 100.

The power supply control unit 160 includes a battery detection circuit, a protection circuit, a DC/DC converter, a low drop-out regulator (an LDO regulator), etc. The power supply control unit 160 detects whether or not a battery has been attached, a type of the battery, and a remaining level of the battery, and has a function of protecting a load circuit connected to a power supply circuit by cutting off the power supply when an overcurrent has been detected. The power supply control unit 160 controls the power supply unit 170 based on an instruction from the system control unit 150, and supplies a desired power supply voltage to each unit of the camera main body 100 for a desired period of time.

The power supply unit 170 is configured by a primary battery such as an alkaline battery or a lithium battery, a secondary battery such as a NiCd battery, a NiMH battery, or a lithium-ion battery, an AC adapter, or the like.

The lens mount 102 and the lens mount 202 are interfaces for connecting the camera main body 100 to the lens unit 200. The connector 101 and the connector 201 are connectors that electrically connect the camera main body 100 and the lens unit 200, the connector 101 is controlled by the system control unit 150, and the connector 201 is controlled by the lens control unit 204.

The lens unit 200 is an interchangeable lens type lens unit, and is able to guide the optical image of the subject (not shown) from the lens 205 via the aperture 203, the lens mount 202, the lens mount 102, and the shutter 103, and form the image on the image pickup device 105.

Next, the configuration of the lens unit 200 will be described.

The lens control unit 204 controls the entire lens unit 200. The lens control unit 204 also includes the function of a memory that stores constants, variables, programs, etc. for operations thereof, and a nonvolatile memory that stores identification information such as a unique number of the lens unit 200, management information, function information such as a maximum aperture value, a minimum aperture value, a focal length, etc., current setting values, past setting values, etc. The lens control unit 204 is able to perform an autofocus operation (an AF operation) by controlling the focusing of the lens 205 and changing an image-forming position of a subject image incident on the image pickup device 105 according to a focused state of the image measured by the image processing unit 106. In addition, the lens control unit 204 also has a function of controlling the aperture 203 and the zooming of the lens 205.

Next, the operation of the precapture photographing of the present invention executed by the camera main body 100 will be described by using a block diagram of FIG. 2.

As shown in FIG. 2, the system control unit 150 includes a determining unit 151 and a communication unit 152.

The determining unit 151 (a precapture photographing control unit) reads out parameters during photographing that can be set by the camera main body 100 from among those stored in the memory 140, and controls the precapture photographing.

Specifically, in the case that the precapture function is turned on, the determining unit 151 repeats the generation of a captured image (a picked-up image) by using the image pickup device 105 while the shutter button 126 is being half-pressed, performs image processing on the captured image (the picked-up image) by using the image processing unit 106, and transmits the captured image that has been image-processed to the communication unit 152 as image data. The communication unit 152 loads the image data from the image processing unit 106 into the system memory 123 (a temporary recording memory) and temporarily stores the image data. At this time, the image data after a certain period of time is sequentially erased from the system memory 123.

In addition, the system timer 122 gives time information to each piece of image data obtained in the system memory 123.

Subsequently, when the shutter button 126 is full-pressed (the full-pressing operation of the shutter button 126 is performed), the actual photographing is executed, and not only the actual-photographed image obtained by the actual photographing is stored in the recording medium 107, but also the image data temporarily stored in the system memory 123 is stored in the recording medium 107 as the precapture-photographed image group.

The actual-photographed image and the precapture photographed image group that have been stored in the recording medium 107 are displayed on the display unit 111.

A precapture photographing control processing according to a first embodiment of the present invention will be described below with reference to a flowchart shown in FIG. 3. Here, the precapture photographing refers to, in the case that the precapture function is turned on and the half-pressing operation of the shutter button 126 has been performed (the first photographing instruction has been issued), repeatedly executing photographing so that a predetermined number of images are stored in the system memory 123.

The precapture photographing control processing according to the first embodiment is executed by the system control unit 150 loading the program stored in the memory 140 into the system memory 123 and reading it out. It should be noted that the precapture function is turned off before the precapture photographing control processing according to the first embodiment starts.

Figure 3:
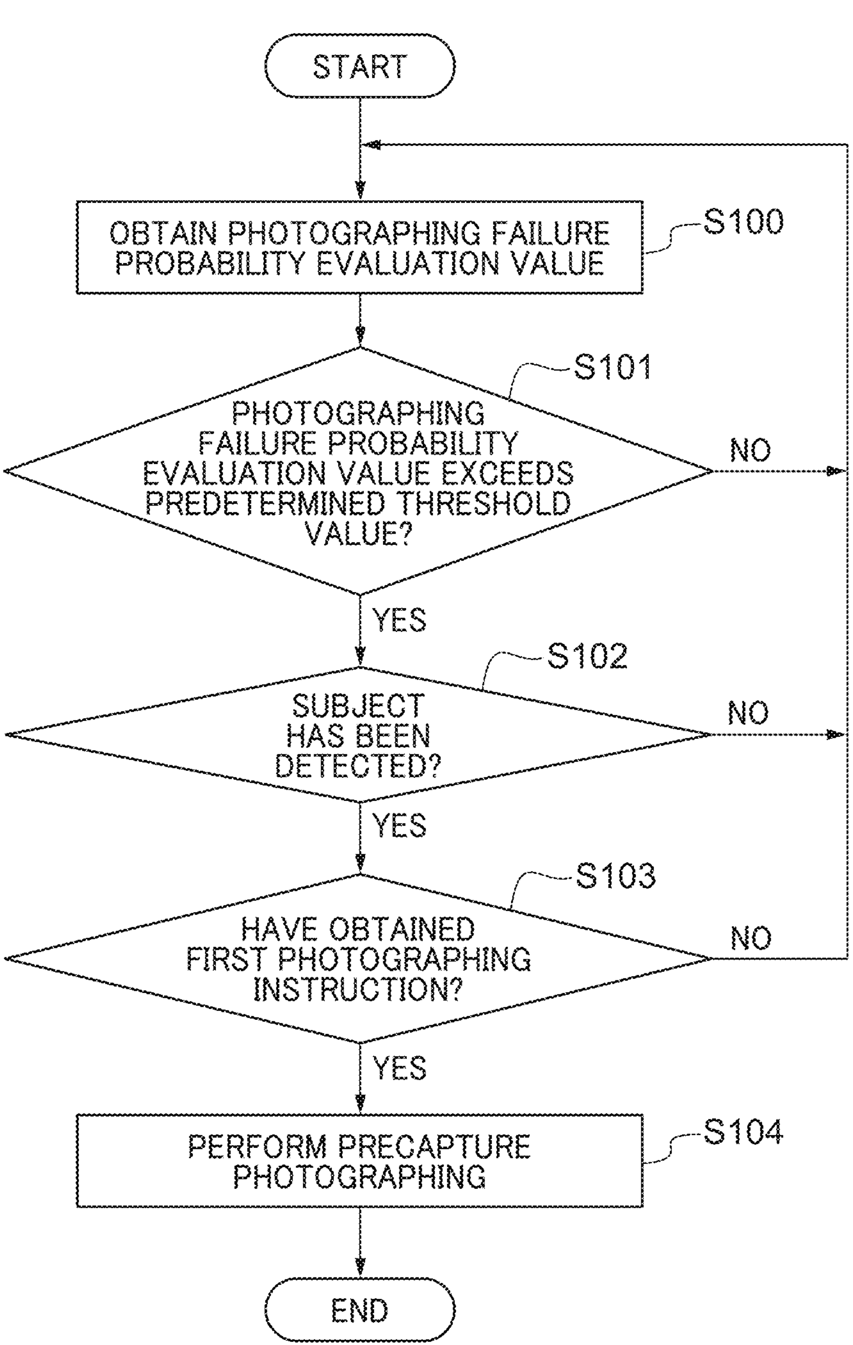
FIG. 3 is a flowchart of a precapture photographing control processing according to a first embodiment of the present invention.

As shown in FIG. 3, first, in a step S100, the system control unit 150 (an obtaining unit) obtains a photographing failure probability evaluation value.

The photographing failure probability evaluation value is a parameter value for evaluating a probability that the actual photographing, which is performed upon the completion of the operation of the shutter button 126, that is, by the full-pressing operation of the shutter button 126 (i.e., in accordance with the second photographing instruction), will fail. For example, a lens focal length, a depth of field (a lens aperture value), an angle of view ratio of a subject, a subject speed, a camera movement amount, a shutter speed, a brightness of a photographing environment, an image blurring amount, an image stabilization value, the biological information of the photographer (such as the blood pressure, the brain wave, and/or the line of sight), etc. can be used as this parameter value. Here, the lens focal length and the depth of field (the lens aperture value) are obtained from the lens control unit 204, the angle of view ratio of the subject and the subject speed are obtained from the image processing unit 106, and the camera movement amount, the image blurring amount, and the image stabilization value (an IBIS correction value) are obtained from the IBIS control unit 108. In addition, the shutter speed is obtained from the shutter control unit 104, the brightness of the photographing environment is obtained from the system control unit 150 itself, and the biological information of the photographer, such as the blood pressure, the brain wave, and/or the line of sight, is obtained from the biological information obtaining unit 130.

In a step S101, the determining unit 151 determines whether or not the photographing failure probability evaluation value obtained in the step S100 exceeds a predetermined threshold value. For example, in the case that the lens focal length is the photographing failure probability evaluation value, when the value of the lens focal length is equal to or longer than a predetermined distance, it is determined exceeding the predetermined threshold value. Furthermore, in the case that the depth of field is the photographing failure probability evaluation value, when the depth of field is shallower than a predetermined depth, it is determined exceeding the predetermined threshold value. In the first embodiment, in the case that the determining unit 151 determines that at least one of a plurality of parameter values that can be used as the photographing failure probability evaluation value and have been illustrated above exceeds the predetermined threshold value (YES in the step S101), the precapture photographing control processing according to the first embodiment shifts to a step S102, and otherwise, the precapture photographing control processing according to the first embodiment returns to the step S100.

In the step S102, the determining unit 151 determines whether or not a subject has been detected by using the result of processing a live view image incident on the image pickup device 105 by the image processing unit 106 or the biological information result obtained by the biological information obtaining unit 130. In the case that a subject has been detected (YES in the step S102), the precapture function is turned on and the precapture photographing control processing according to the first embodiment shifts to a step S103, and otherwise, the precapture photographing control processing according to the first embodiment returns to the step S100. In the first embodiment, in the case that the live view image shows a uniform object such as a wall or the sky, or something that is not a photographing target, such as a bird or an object, it is determined that a subject has not been detected. It should be noted that the purpose of the step S102 is to suppress the power consumption of the camera main body 100, and in the case that priority is given to reducing the loss of opportunities for photographing, if YES in the step S101, the precapture photographing control processing according to the first embodiment may directly proceed to the step S103. The same applies to a step S203, which will be described below.

In the step S103, the determining unit 151 determines whether or not the system control unit 150 has obtained a first photographing instruction from, for example, the shutter button 126. In the case that the system control unit 150 has obtained a first photographing instruction (YES in the step S103), the precapture photographing control processing according to the first embodiment shifts to a step S104, and otherwise, the precapture photographing control processing according to the first embodiment returns to the step S100.

In the step S104, while obtaining the first photographing instruction, the precapture photographing is performed so that a predetermined number of images are stored in the system memory 123, and when the first photographing instruction is completed, the precapture function is turned off, and the precapture photographing control processing according to the first embodiment end.

According to the first embodiment, in the case that the photographing failure probability evaluation value exceeds the predetermined threshold value and the subject has been detected, the precapture function is turned on, and the precapture photographing is performed in accordance with the first photographing instruction. As a result, it becomes possible to reduce the loss of the opportunities for photographing.

A precapture photographing control processing according to a second embodiment of the present invention will be described below with reference to a flowchart shown in FIG. 4.

Similar to the first embodiment, the precapture photographing control processing according to the second embodiment is also executed by the system control unit 150 loading the program stored in the memory 140 into the system memory 123 and reading it out. In addition, the precapture function is turned off before the precapture photographing control processing according to the second embodiment starts.

Figure 4:
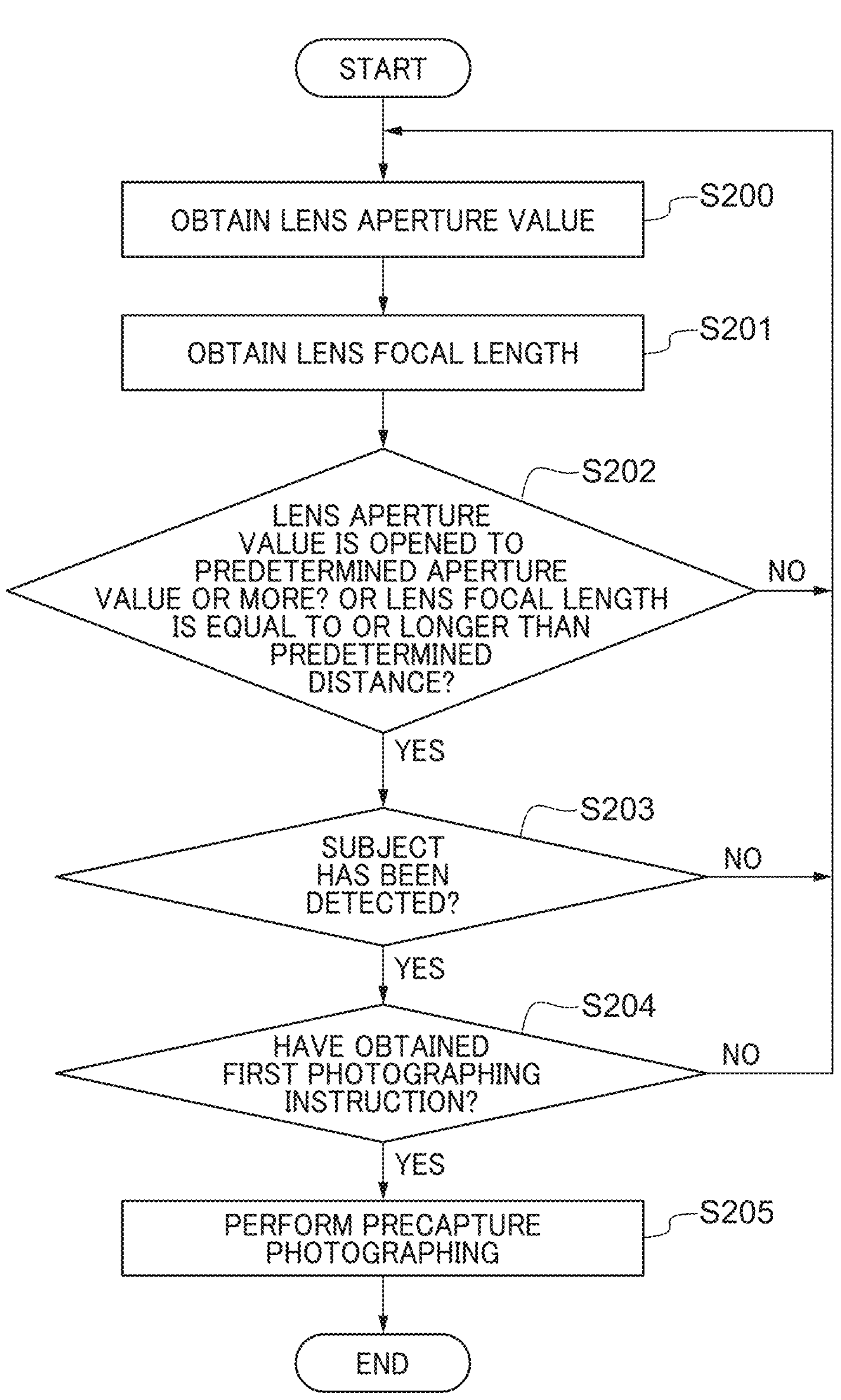
FIG. 4 is a flowchart of a precapture photographing control processing according to a second embodiment of the present invention.

As shown in FIG. 4, first, in a step S200, the system control unit 150 (the obtaining unit) obtains a lens aperture value from the lens control unit 204.

In a step S201, the system control unit 150 (the obtaining unit) obtains a lens focal length from the lens control unit 204.

In a step S202, the determining unit 151 determines whether or not the lens aperture value obtained in the step S200 is opened to a predetermined aperture value or more, and whether or not the lens focal length obtained in the step S201 is equal to or longer than a predetermined distance. In the case that the lens aperture value is opened to the predetermined aperture value or more, or in the case that the lens focal length is equal to or longer than the predetermined distance (YES in the step S202), the precapture photographing control processing according to the second embodiment proceeds to the step S203, and otherwise (NO in the step S202), the precapture photographing control processing according to the second embodiment returns to the step S200. Here, the state in which the lens aperture value is opened to the predetermined aperture value or more refers to a state in which the depth of field is shallow and it is difficult to focus on a main subject. In addition, the state in which the lens focal length is equal to or longer than the predetermined distance refers to a state in which the field of view is narrow and it is difficult to fit the main subject within the angle of view. That is, in the step S202, it is determined whether or not it is difficult to photograph the main subject and a probability that the actual photographing will fail is high.

In the step S203, the determining unit 151 determines whether or not a subject has been detected by the same process as the step S102 being performed. In the case that a subject has been detected (YES in the step S203), the precapture function is turned on and the precapture photographing control processing according to the second embodiment shifts to a step S204, and otherwise, the precapture photographing control processing according to the second embodiment returns to the step S200.

In the step S204, the determining unit 151 determines whether or not the system control unit 150 has obtained a first photographing instruction from, for example, the shutter button 126. In the case that the system control unit 150 has obtained a first photographing instruction (YES in the step S204), the precapture photographing control processing according to the second embodiment shifts to a step S205, and otherwise, the precapture photographing control processing according to the second embodiment returns to the step S200.

In the step S205, while obtaining the first photographing instruction, the precapture photographing to execute photographing is performed so that a predetermined number of images are stored in the system memory 123, and when the first photographing instruction is completed, the precapture function is turned off, and the precapture photographing control processing according to the second embodiment end.

According to the second embodiment, in the case that the lens aperture value is opened to the predetermined aperture value or more or the lens focal length is equal to or longer than the predetermined distance, and the subject has been detected, the precapture function is turned on, and the precapture photographing is performed in accordance with the first photographing instruction. As a result, it becomes possible to reduce the loss of the opportunities for photographing.

In a third embodiment of the present invention, before starting the processing of the first embodiment or the processing of the second embodiment, it is confirmed whether or not a photographing intention of the user is high.

A precapture photographing control processing according to the third embodiment of the present invention will be described below with reference to a flowchart shown in FIG. 5.

Similar to the first embodiment and the second embodiment, the precapture photographing control processing according to the third embodiment is also executed by the system control unit 150 loading the program stored in the memory 140 into the system memory 123 and reading it out. In addition, the precapture function is turned off before the precapture photographing control processing according to the third embodiment starts.

Figure 5:
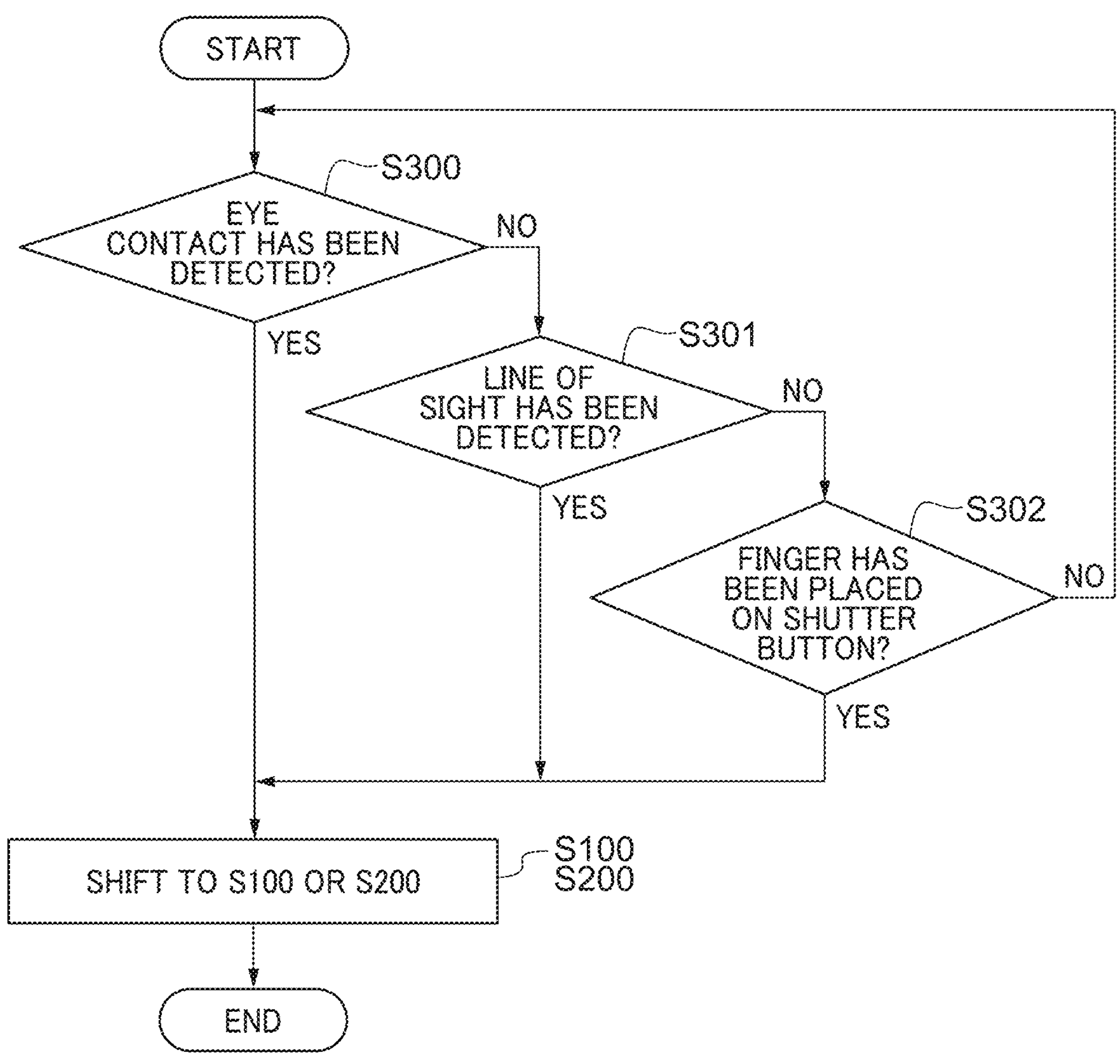
FIG. 5 is a flowchart of a precapture photographing control processing according to a third embodiment of the present invention.

As shown in FIG. 5, first, in a step S300, the system control unit 150 obtains the eye contact detection information from the biological information obtaining unit 130, and in the case that eye contact has been detected (YES in the step S300), the precapture photographing control processing according to the third embodiment shifts to either the step S100 or the step S200. On the other hand, in the case that eye contact has not been detected (NO in the step S300), the precapture photographing control processing according to the third embodiment shifts to a step S301.

In the step S301, the system control unit 150 obtains the line-of-sight detection information from the biological information obtaining unit 130, and in the case that a line of sight has been detected (YES in the step S301), the precapture photographing control processing according to the third embodiment shifts to either the step S100 or the step S200. On the other hand, in the case that a line of sight has not been detected (NO in the step S301), the precapture photographing control processing according to the third embodiment shifts to a step S302.

In the step S302, the system control unit 150 obtains, from the shutter button 126, a detection result of whether or not a finger has been placed on the top surface of the shutter button 126. In the case that a finger has been placed on the top surface of the shutter button 126 (YES in the step S302), the precapture photographing control processing according to the third embodiment shifts to either the step S100 or the step S200. On the other hand, in the case that a finger has not been placed on the top surface of the shutter button 126 (NO in the step S302), the precapture photographing control processing according to the third embodiment returns to the step S300.

According to the third embodiment, it is confirmed in advance whether or not to correspond to respective cases in which it is assumed that the photographing intention of the user is high (YES in the step S300, YES in the step S301, and YES in the step S302). As a result of this confirmation, in the case that it is assumed that the photographing intention of the user is high, proceeding to the step S100 and obtaining the photographing failure probability evaluation value, or proceeding to the step S200 and obtaining the lens aperture value or the lens focal length, and then determining whether or not to turn on the precapture function. On the other hand, in the case that none of the above-described respective cases correspond to and it is assumed that the photographing intention of the user is low, the precapture photographing control processing according to the third embodiment is ended as is, and the precapture photographing will not be performed even if the first photographing instruction is issued. As a result, it is possible to prevent the precapture function from being turned on unnecessarily even though the user does not wish to do so.

In a fourth embodiment of the present invention, in the case that the photographing failure probability evaluation value becomes equal to or less than the predetermined threshold value while performing the precapture photographing, the precapture photographing is stopped.

For example, in the case that the photographing failure probability evaluation value is the subject speed, if the subject speed exceeds a predetermined speed, since the probability that the actual photographing will fail is high, it is desirable to turn on the precapture function. However, during the precapture photographing, in the case that the movement of the subject slows down in the middle of the photographing and the subject speed becomes equal to or less than the predetermined speed, the probability that the actual photographing will fail becomes low, and the precapture photographing becomes unnecessary. The fourth embodiment is an exception processing used in such a case.

A precapture photographing control processing according to the fourth embodiment of the present invention will be described below with reference to a flowchart shown in FIG. 6.

Similar to the first embodiment, the second embodiment, and the third embodiment, the precapture photographing control processing according to the fourth embodiment is also executed by the system control unit 150 loading the program stored in the memory 140 into the system memory 123 and reading it out. It should be noted that the precapture photographing control processing according to the fourth embodiment starts when the precapture function is turned on and the half-pressing operation of the shutter button 126 has been performed.

Figure 6:
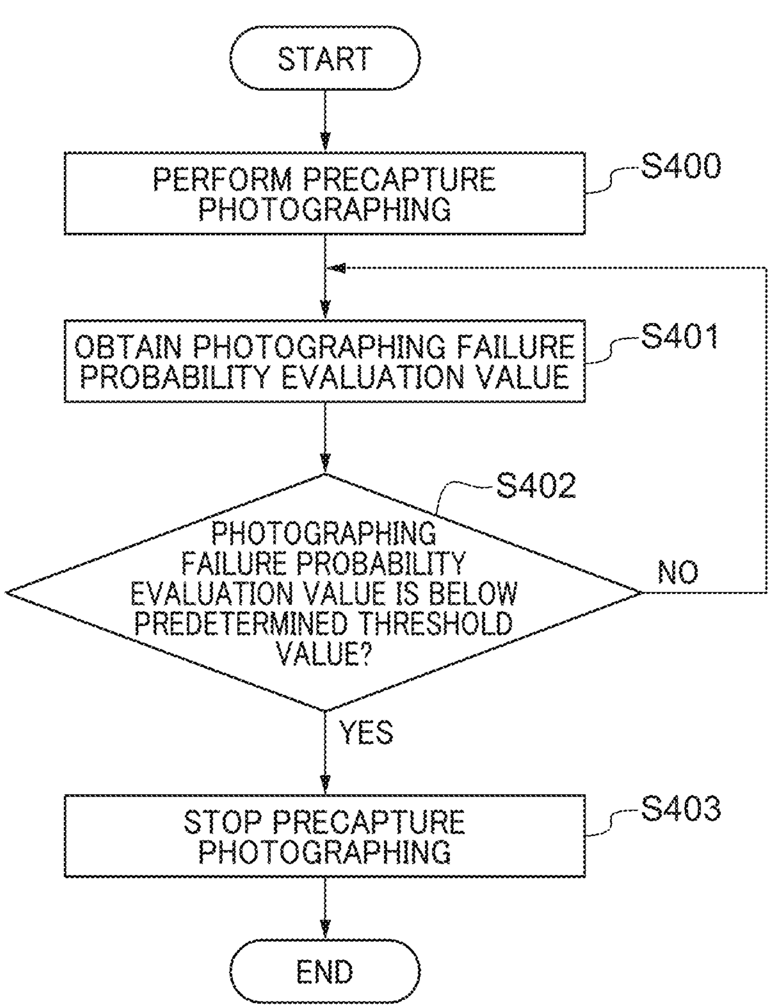
FIG. 6 is a flowchart of a precapture photographing control processing according to a fourth embodiment of the present invention.

As shown in FIG. 6, first, in a step S400, the precapture photographing is performed.

In a step S401, the system control unit 150 obtains a photographing failure probability evaluation value. The photographing failure probability evaluation value has been described above in the description of the step S100, so a duplicate description will be omitted.

In a step S402, the determining unit 151 determines whether or not the photographing failure probability evaluation value obtained in the step S401 exceeds the predetermined threshold value. In the case that the photographing failure probability evaluation value obtained in the step S401 does not exceed the predetermined threshold value (YES in the step S402), the precapture photographing control processing according to the fourth embodiment shifts to a step S403, and otherwise (NO in the step S402), the precapture photographing control processing according to the fourth embodiment returns to the step S401. It should be noted that in the fourth embodiment, in the case that at least one of the plurality of parameter values that can be used as the photographing failure probability evaluation value and have been described above exceeds the predetermined threshold value, the determining unit 151 determines that the photographing failure probability evaluation value exceeds the predetermined threshold value.

In the step S403, the precapture photographing is stopped.

According to the fourth embodiment, the photographing failure probability evaluation value is obtained during the precapture photographing, and in the case that the photographing failure probability evaluation value does not exceed the predetermined threshold value, the precapture photographing is stopped. As a result, it is possible to prevent wasteful execution of the precapture photographing in the case that the probability that the actual photographing will fail is low.

In a fifth embodiment of the present invention, before starting the processing of the first embodiment, it is confirmed whether or not a subject to be photographed is a subject for which the actual photographing is likely to fail.

For example, the subject detection function of the image processing unit 106 may detect a small, fast-moving subject such as an airplane or a bird as the subject to be photographed from the live view image. In this case, in comparison to a case where the subject to be photographed is a person, since the probability that the actual photographing will fail becomes low, it is desirable to turn on the precapture function. The fifth embodiment is a processing used in such a case.

A precapture photographing control processing according to the fifth embodiment of the present invention will be described below with reference to a flowchart shown in FIG. 7.

Similar to the first embodiment, the second embodiment, the third embodiment, and the fourth embodiment, the precapture photographing control processing according to the fifth embodiment is also executed by the system control unit 150 loading the program stored in the memory 140 into the system memory 123 and reading it out. In addition, the precapture function is turned off before the precapture photographing control processing according to the fifth embodiment starts.

Figure 7:
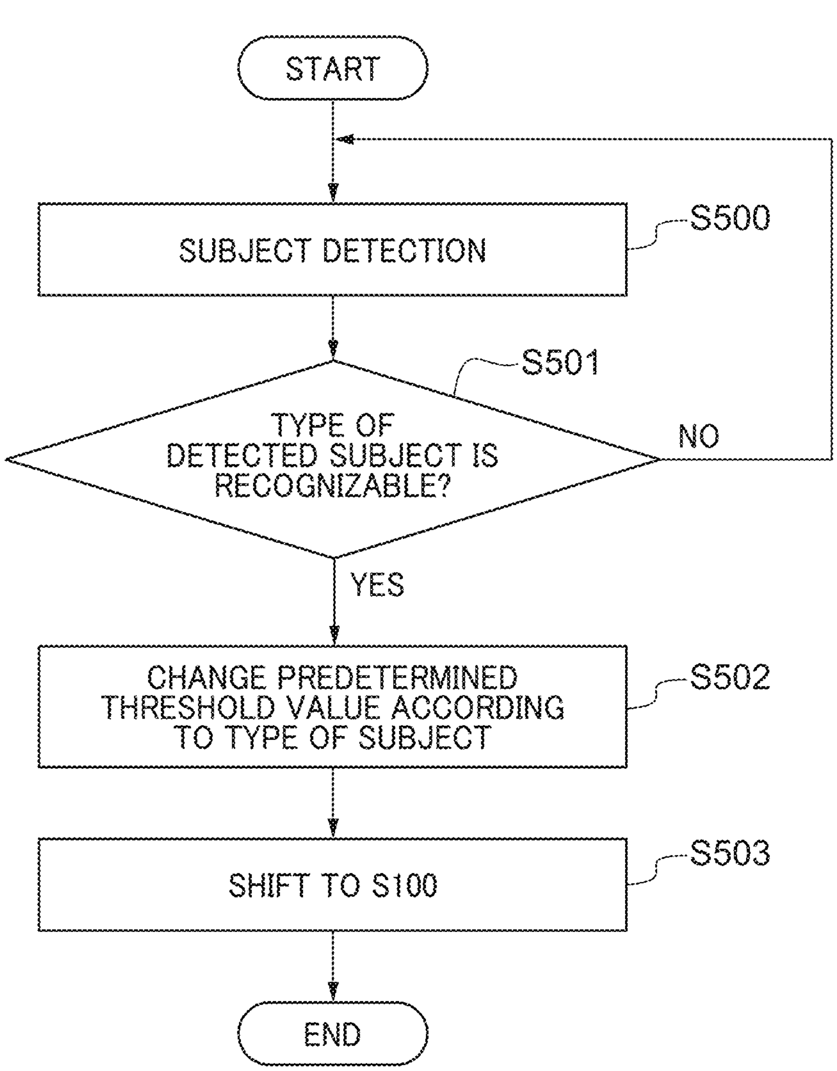
FIG. 7 is a flowchart of a precapture photographing control processing according to a fifth embodiment of the present invention.

As shown in FIG. 7, first, in a step S500, the system control unit 150 detects a subject by using the subject detection function (a subject detecting unit) of the image processing unit 106.

In a step S501, it is determined whether or not a type of the subject detected in the step S500 is recognizable. Specifically, first, the system control unit 150 and the image processing unit 106 determine characteristic points from the subject detected in the step S500. Next, in comparison to characteristic points of a subject candidate stored in the memory 140, the determining unit 151 (a recognizing unit) determines whether or not to have a degree of similarity above a certain level. In the case of having the degree of similarity above a certain level, it is determined that the type of the subject detected in the step S500 is recognizable, that is, it is determined that it is the subject candidate stored in the memory 140 (YES in the step S501), and the precapture photographing control processing according to the fifth embodiment shifts to a step S502. On the other hand, in the case of not having the degree of similarity above a certain level, it is determined that the type of the subject detected in the step S500 is not recognizable (NO in the step S501), and the precapture photographing control processing according to the fifth embodiment returns to the step S500.

In the step S502, the predetermined threshold value is changed depending on the type of the subject recognized in the step S501. For example, in the case that the subject recognized in the step S501 is a type of subject that moves quickly and is small, such as a bird, or a type of subject that moves quickly, such as an airplane, since the probability that the actual photographing will fail is high, the predetermined threshold value of the photographing failure probability evaluation value is increased. On the other hand, in the case that the subject recognized in the step S501 is a type of subject that does not move, such as a building, since the probability that the actual photographing will fail is low, the predetermined threshold value of the photographing failure probability evaluation value is decreased.

In a step S503, shifting to the step S100, and the precapture photographing control processing according to the fifth embodiment is ended.

According to the fifth embodiment, since the predetermined threshold value of the photographing failure probability evaluation value is changed depending on the type of the detected subject, it is possible to perform the precapture photographing with high accuracy.

It should be noted that the predetermined aperture value or the predetermined distance that is used for the determination in the step S202 may be changed depending on the type of the detected subject, and in the step S503, the processing may shift to the step S200. For example, for a type of subject that has a high probability that the actual photographing will fail, the predetermined aperture value is changed to a larger value (the open side) and the predetermined distance is changed to a longer distance.

It should be noted that, in the embodiments of the present invention, it is also possible to implement processing in which a program for implementing one or more functions is supplied to a computer of a system or an apparatus via a network or a storage medium, and a system control unit of the system or the apparatus reads out and executes the program. The system control unit may include one or more processors or circuits, and in order to read out and execute executable instructions, the system control unit may include multiple isolated system control units or a network of multiple isolated processors or circuits.

The processor or circuit may include a central processing unit (CPU), a micro processing unit (MPU), a graphics processing unit (GPU), an application-specific integrated circuit (ASIC), and/or a field-programmable gate array (FPGA). In addition, the processor or circuit may include a digital signal processor (DSP), a data flow processor (DFP), or a neural processing unit (NPU).

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., ASIC) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-086868, filed on May 26, 2023, which is hereby incorporated by reference herein in its entirety.

What is claimed is:

1. An image pickup apparatus that starts photographing preparation based on a first photographing instruction and performs actual photographing based on a second photographing instruction, the image pickup apparatus comprising:

an image pickup device configured to generate a photographed image from an optical image guided via a lens unit;

a temporary recording memory configured to temporarily record the photographed image;

an obtaining unit configured to obtain a lens focal length of the lens unit;

a precapture photographing control unit configured to, in a case that a precapture function is turned on, control precapture photographing to record the photographed image in the temporary recording memory based on the first photographing instruction; and an accepting unit configured to accept an instruction to switch turning-on/turning-off of the precapture function from a user, wherein the precapture photographing control unit turns on the precapture function in a case that the lens focal length is equal to or longer than a predetermined distance, and executes the precapture photographing when the first photographing instruction has been issued, and wherein in a case that a subject has not been detected from the photographed image, the precapture photographing control unit does not turn on the precapture function even if the lens focal length obtained by the obtaining unit is equal to or longer than the predetermined distance.

2. The image pickup apparatus according to claim 1, further comprising:

a first detecting unit configured to detect eye contact of the user;

a second detecting unit configured to detect a line of sight of the user; and a third detecting unit configured to detect that a finger has been placed on a top surface of a shutter button for issuing the first photographing instruction and the second photographing instruction, and wherein, in a case that the precapture photographing control unit determines that it has been detected by any one of the first detecting unit, the second detecting unit, and the third detecting unit, the obtaining unit obtains the lens focal length.

3. The image pickup apparatus according to claim 1, further comprising:

a subject detecting unit configured to detect a subject; and a recognizing unit configured to recognize a type of the detected subject, and wherein the precapture photographing control unit changes the predetermined distance depending on the recognized type of the subject.

4. A control method for an image pickup apparatus that starts photographing preparation based on a first photographing instruction and performs actual photographing based on a second photographing instruction, the control method comprising:

a generating step of generating a photographed image by using an image pickup device from an optical image guided via a lens unit;

a temporary recording step of temporarily recording the photographed image in a temporary recording memory;

an obtaining step of obtaining a lens focal length of the lens unit;

a precapture photographing control step of, in a case that a precapture function is turned on, controlling precapture photographing to temporarily record the photographed image, which is generated in the generating step based on the first photographing instruction, in the temporary recording step; and an accepting step of accepting an instruction to switch turning-on/turning-off of the precapture function from a user, wherein in the precapture photographing control step, in a case that the lens focal length is equal to or longer than a predetermined distance, the precapture function is turned on, and when the first photographing instruction has been issued, the precapture photographing is executed, and wherein in the precapture photographing control step, in a case that a subject has not been detected from the photographed image, the precapture function is not turned on even if the lens focal length obtained by the obtaining unit is equal to or longer than the predetermined distance.

5. A non-transitory computer-readable storage medium storing a program for causing a computer to execute a control method for an image pickup apparatus that starts photographing preparation based on a first photographing instruction and performs actual photographing based on a second photographing instruction, the control method comprising:

a generating step of generating a photographed image by using an image pickup device from an optical image guided via a lens unit;

a temporary recording step of temporarily recording the photographed image in a temporary recording memory;

an obtaining step of obtaining a lens focal length of the lens unit;

a precapture photographing control step of, in a case that a precapture function is turned on, controlling precapture photographing to temporarily record the photographed image, which is generated in the generating step based on the first photographing instruction, in the temporary recording step; and an accepting step of accepting an instruction to switch turning-on/turning-off of the precapture function from a user, wherein in the precapture photographing control step, in a case that the lens focal length is equal to or longer than a predetermined distance, the precapture function is turned on, and when the first photographing instruction has been issued, the precapture photographing is executed, and wherein in the precapture photographing control step, in a case that a subject has not been detected from the photographed image, the precapture function is not turned on even if the lens focal length obtained by the obtaining unit is equal to or longer than the predetermined distance.

* * * * *